United States Patent [19]

Mallow et al.

[11] Patent Number: 4,828,620

[45] Date of Patent: May 9, 1989

[54] CALCINATION OF CALCIUM CARBONATE AND BLEND THEREFOR

[75] Inventors: William A. Mallow, Helotes; Jerome J. Dziuk, Jr., San Antonio, both of Tex.

[73] Assignee: Southwest Research Institute, San Antonio, Tex.

[21] Appl. No.: 89,830

[22] Filed: Aug. 27, 1987

[51] Int. Cl.$^4$ .............................................. C01F 11/06
[52] U.S. Cl. ............................ 106/100; 106/118; 252/182.32; 423/175; 423/177; 423/637
[58] Field of Search ............... 106/100, 118; 423/175, 423/177, 637; 252/182.32

[56] References Cited

U.S. PATENT DOCUMENTS

| | | | |
|---|---|---|---|
| 1,588,253 | 6/1926 | Mathers et al. | 423/637 |
| 2,587,044 | 2/1952 | Heilmann | 106/100 |
| 3,139,351 | 6/1964 | Hammer, Sr. | 106/89 |
| 3,589,920 | 6/1971 | Ostberg et al. | 106/100 |
| 3,819,389 | 6/1974 | Uchikawa et al. | 106/100 |
| 3,884,710 | 5/1975 | Allen et al. | 106/89 |
| 4,083,730 | 4/1978 | Kwech et al. | 106/89 |
| 4,619,702 | 10/1986 | Gartner | 106/100 |
| 4,710,226 | 12/1987 | Mallow | 106/118 |

FOREIGN PATENT DOCUMENTS 80391 5/1984 Japan .............................. 252/182.32

OTHER PUBLICATIONS

International Publication Number WO84/03691, published 9-27-84.
Robert S. Boynton, Chemistry and Technology of Lime and Limestone (1966), Interscience Publishers, pp. 153, 154.

Primary Examiner—Robert L. Stoll
Assistant Examiner—Wayne A. Langel
Attorney, Agent, or Firm—Sigalos, Levine & Montgomery

[57] ABSTRACT

A method for calcination of a calcium carbonate material comprising heating the calcium carbonate material to a temperature and for a time sufficient to calcine the material to the degree desired while in the presence of a catalyst; said catalyst comprising at least one fused salt having the formula $$MCO_3.CaCO_3.CaO.H_2O_x,$$

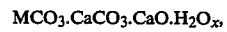

wherein M is an alkali metal and x is 0 to 1 and formed by fusing $MCO_3$ and $CaCO_3$ in a molar ratio of about 1:2 to 2:1, and a blend adapted to be heated to CaO comprising a calcium carbonate material and at least one such fused salt.

11 Claims, 2 Drawing Sheets

CALCINATION OF CALCIUM CARBONATE AND BLEND THEREFOR

This invention was made under United States Government Contract No. DE-AC03-79CS-40250 and United States Government has a nonexclusive, nontransferable, irrevocable, paid-up license to practice or have practiced for or on behalf of the United States, this invention through the world.

BACKGROUND OF THE INVENTION

A great deal of energy is expended to calcine a calcium carbonate-containing material such as limestone to calcium oxide as is required, for example, in the production of lime and hydraulic cements. Most lime is produced in energy-intensive rotary or shaft kilns. The process is relatively simple in that particulate materials are fed into refractory lined furnaces, mixed with suitable fuels, and subjected to intense heat caused by the combustion of the fuel. Provisions are made to optimize exposure of the feeds to the thermal environment and the system is an open one to permit escape of the products of calcination; lime and carbon dioxide and traces of moisture. The heating or calcination of limestone into lime requires breaking an oxygen-to-carbon bond and liberating carbon dioxide. The calcination reaction is represented by the equilibrium equation:

$$CaCO_3 \rightleftharpoons CaO + CO_2$$

In commercial practice the actual energy employed is many times greater than the theoretical bond strength due to heat losses, heat transfer properties, and the impetus required to remove the liberated carbon dioxide. Large amounts of energy are also required in fluidized bed calciners.

Large amounts of energy are used in such calcination to hasten calcination and promote the removal of $CO_2$ from the reaction bed. Such usage, while not expensive when fuel was inexpensive, was wasteful and, in some cases, when excessive temperatures were used, often resulted in overburing or hard burning and caused the reaction of lime with impurities producing hard grains in the lime.

With escalation of energy costs due to increases in the price of fossil fuels such as oil and coal, many efforts have been undertaken to conserve energy and reduce costs in this energy intensive process. These have included changes in apparatus, the use of air purges, evacuation, or collection of the carbon dioxide, and the use of "dry feed" practices to eliminate the need for large amounts of energy to remove water from the calcined product. While effecting some reduction in fuel usage, they have not been entirely successful in cutting costs.

It is to be understood, of course, that the energy consumption in the production of lime by calcination of limestone is also applicable to the cement industry where the calcination of limestone represents a major portion of the energy-consuming process.

SUMMARY OF THE INVENTION

The present invention overcomes the problems of the prior art and permits the rapid calcination of calcium carbonate at faster rates and at lower kiln temperatures with up to about a 50 percent reduction in present fuel energy requirements.

Briefly, the present invention comprises the method for accelerated calcination of a calcium carbonate material comprising heating the calcium carbonate material to a temperature and for a time sufficient to calcine the material to the degree desired while in the presence of a fused salt catalyst; said catalyst comprising at least one fused salt having the formula $MCO_3 \cdot CaCO_3 \cdot CaO \cdot H_2O_x$, wherein M is an alkali metal and x is 0 or 1, and the salt is formed by fusing $MCO_3 \cdot CaCO_3$ in a molar ratio of about 1:2 to 2:1.

The invention also comprises a blend adapted to be heated to form CaO comprising a calcium carbonate material and at least one fused salt having the formula $MCO_3 \cdot CaCO_3 \cdot CaO \cdot H_2O_x$, wherein M is an alkali metal and x is 0 or 1.

DETAILED DESCRIPTION

Figure 1:
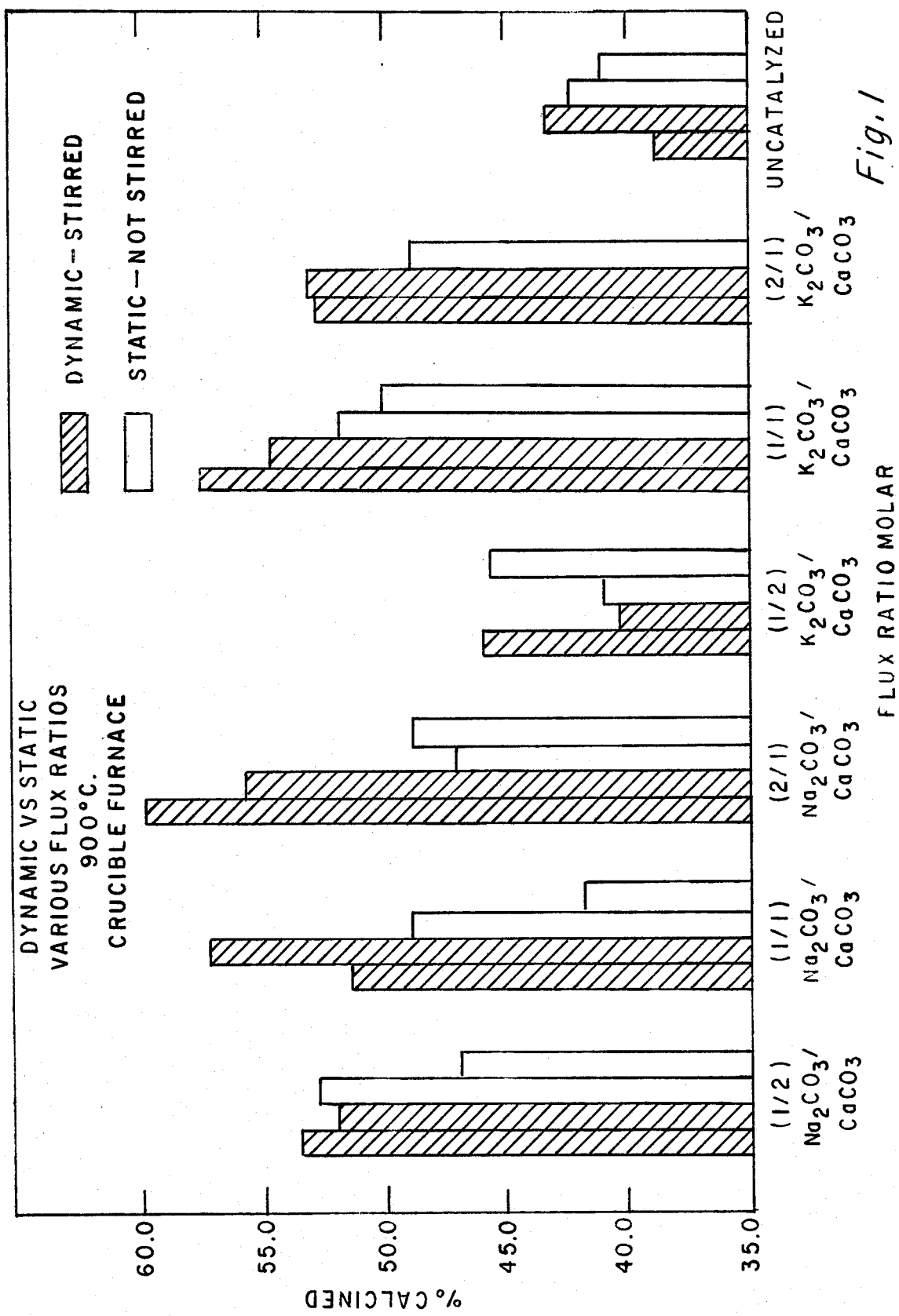
FIG. 1 is a graph showing the results of dynamic versus static calcination that is the subject of Example 1 hereof.

While the instant invention broadly relates to any process or blend where a calcium carbonate material is to be calcined by heat, it will be described in detail with respect to one of the most important industries where this occurs; namely, the manufacture of hydraulic cements. A major step in that process is calcination of a calcium carbonate material. When referring herein to a "calcium carbonate material", it is intended to mean limestone, dolomite, or any other source of calcium carbonate conventionally used to make lime, cements, and the like. Limestone is, of course, the most commonly used source of calcium carbonate for these purposes.

The instant process requires the use of certain catalysts which are, in broadest outline, thermal reaction products of calcium carbonate and an alkali metal carbonate. These catalysts can be described as fused salts and have a vitreous nature. The calcium carbonate used to make the catalyst can be any calcium carbonate-containing material such as the limestone, dolomite or calcium carbonate per se. With respect to the alkali metal carbonates, illustrative examples are sodium carbonate, potassium carbonate, lithium carbonate, cesium carbonate, and the like. Of the alkali materials used, it is preferred to use sodium or potassium carbonate. The fused salts have the formula

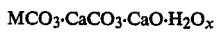

$$MCO_3 \cdot CaCO_3 \cdot CaO \cdot H_2O_x$$

in which M is the alkali metal and x is 0 or 1.

The catalysts are formed by admixing, preferably in equal molar ratios, a calcium carbonate material with any one or a mixture of the noted alkali metal compounds. The alkali metal carbonate and calcium carbonate cannot be combined in any ratio, and there is a difference dependent the particular alkali metal used. The ratio of $MCO_3$ to $CaCO_3$ is from about 1:2 to 2:1. For most beneficial results the ratio of $Na_2CO_3:CaCO_3$ is from about 1:2 to 2:1 and for $K_2CO_3:CaCO_3$ the ratio is from about 1:1 to 2:1. This is surprising and not completely understood since potassium compounds in general have greater chemical reactivity. While this reversal is not completely understood it is believed that an element of spatial or steric accessibility is involved together with the role of electronegativity. These contribute to the accessibility to the calcium carbonate at the carbon-oxygen site. The other alkali metal carbonates fall within the ratio ranges noted.

The mixture is preferably ground to a homogeneous blend and heated to a temperature sufficient and for a time sufficient to assure fusion to a vitreous-like mass; usually a temperature of about 900° to 1000° C. (±100° C.). The fused salt is then cooled and ground to a particle size which is preferably either above or below that of the calcium carbonate material to be calcined for the reason set forth below. Grinding to a mesh size of about −100 to +200 is preferred.

As to the process of calcination, from about 0.1 to about 20 parts by weight of the granular catalyst; preferably about 1 to 10 parts by weight, are then added for each 100 parts by weight of the calcium carbonate material, the mixture then fed into a furnace, and then heated to a temperature and for a time sufficient to get the desired degree of calcination. While the precise calcining temperature and treatment time will vary depending upon the efficiency of the furnace, the particular catalyst, and the uniformity of the heating, it has been found that temperatures as low as 450° C., but preferably 800° to 900° C., for about thirty to fortyfive minutes is sufficient for proper calcination. This is to be contrasted with calcination temperatures of about 1200° to 1350° C. required for longer periods of time in the absence of the fused salt.

When the heat treatment is finished, the treated mixture will comprise free lime and magnesia (from dolomitic limestone) with the unaltered fused salt catalyst. By providing for a difference in the particle size between the catalyst and the untreated limestone, it is possible to easily separate the catalyst for reuse by using any conventional separation procedure, such as screening or air classification.

In instances where the fused salt is one formed by reacting a sodium or potassium carbonate with calcium carbonate, such catalyst may be allowed to remain as part of the final product since it will have a very low sodium or potassium content and will not be deleterious for many of the uses for which the cement is required.

For most effective results the catalyst and calcium carbonate material should be finely ground to about −100 to −200 mesh powder. This optimizes the activity of the catalyst and assures a more complete burn and economy of fuel. Thus, for present cement operations using coarse feeds, a pre-grinding of the feed to the noted mesh is suggested.

Figure 2:
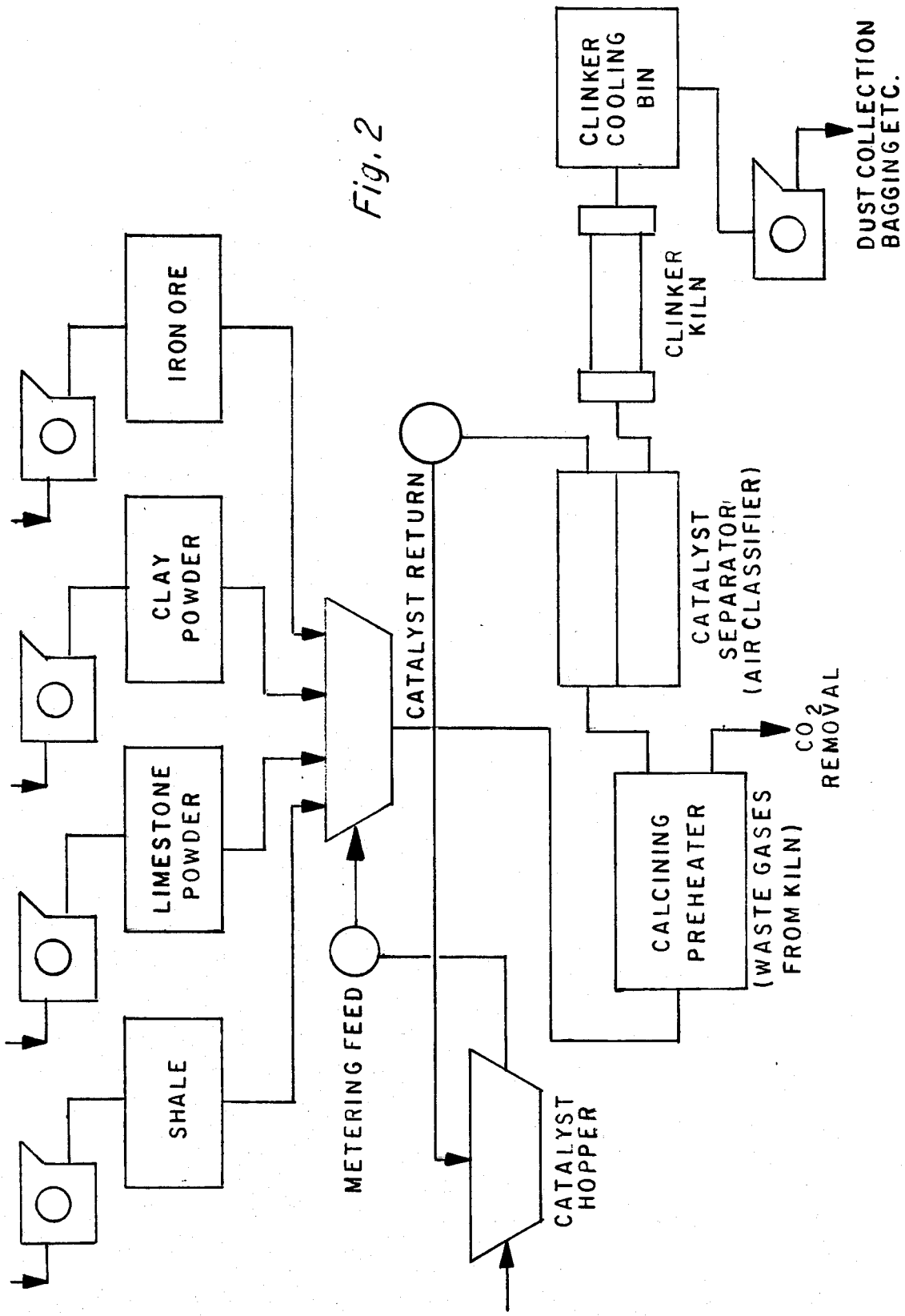
FIG. 2 is a flow diagram of catalyzed Portland cement production.

FIG. 2 hereof is a flow diagram of Portland cement manufacture with the catalyst wherein there is a calcining preheater to calcine the mineral mixture containing the limestone powder in the feed prior to formation of the clinker. By utilizing a catalyst of a different particle size than the other materials it is possible to separate the catalyst by a conventional air classifier after calcination for reuse in the calcining preheater. With low amounts of catalyst; i.e., about 1% to 3%, it is not necessary to remove the catalyst prior to clinkering since the low level of alkali metal will not adversely affect the resultant Portland cement. This difference in particle size also permits use of the catalyst in a counter-flow fluidized bed reactor. The limestone is feed through a bed of the catalyst.

The invention will be further described in connection with the following examples which are set forth for purposes of illustration only.

EXAMPLE 1

To duplicate kiln conditions a series of fourteen tests were carried out utilizing "static" or unagitated limestone mixtures with various catalyst compositions and without any catalyst.

The same limestone mixtures and catalyst compositions were also calcined under "dynamic" or agitated conditions to simulate a commercial kiln.

The tests were duplicated in order to determine the degree of reproducibility.

The calcination was carried out at 900° C. for the same period of time for each test and the percent of calcination measured and the results are shown in FIG. 1.

These results show the greater percentage of calcination with use of the fused salts of the instant invention.

EXAMPLE 2

Two tests were carried out to show the catalytic nature of the fused salts.

In the first test, the catalysts were ground to +200 mesh and added to calcium carbonate which was −325 mesh. The same test was repeated by sieving out the fused catalyst from the first test and using it for the second test. In each case equal molar ratios of $NaCO_3$ and $K_2CO_3$ on the one hand and of the $CaCO_3$ were used to form the fused salt and the ratio of fused salt to the calcium carbonate was varied from 1:10 to 1:20 parts by weight. The recovery of the catalyst was approximately 94 percent. The results were as follows:

| Sample Composition | % Calcination | % Catalytic Activity |
|---|---|---|
| | First Test | |
| 1:10 50/50 K Cat. | 35.22 | 39.0 |
| 1:20 50/50 K Cat. | 36.63 | 44.6 |
| 1:10 50/50 Na Cat. | 36.36 | 43.5 |
| 1:20 50/50 Na Cat. | 35.56 | 40.4 |
| Pure $CaCO_3$ | 25.33 | 0.0 |
| | Second Test | |
| 1:10 50/50 K Cat. | 33.08 | 35.1 |
| 1:20 50/50 K Cat. | 34.60 | 41.3 |
| 1:10 50/50 Na Cat. | 33.68 | 37.6 |
| 1:20 50/50 Na Cat. | 33.29 | 36.0 |
| Pure $CaCO_3$ | 24.48 | 0.0 |

Thus, very little loss in percent calalytic activity was observed between the first and second tests. Since the catalyst was recovered from the first experiment and used again in the second experiment, the fused salt is truly a catalyst.

EXAMPLE 3

Using an 8-foot long, gas-fired rotary kiln, a number of catalyzed and uncatalyzed calcination studies were performed. Most of the tests on this laboratory scale rotary kiln were conducted at two temperature regions and sampling was performed at 20-minute intervals during the 4th and 5th hours of a 5-hour period. Three hours of continuous feeding were performed to assure steady-state operation after which sampling was initiated and continued throughout the run. Temperatures of 840° to 855° C. were compared with 775° to 790° C. (at kiln discharge) with about 125° C. lower temperature in the feed zone.

At the higher temperature the degree of calcination was too high to properly contrast the catalyzed and uncatalyzed; however, the catalyzed samples emerged at 98-100% complete while the uncatalyzed varied from 81-89% calcined. At 775° to 790° C., the uncatalyzed feed emerged at 41-43% calcined compared to 77-79% with the catalyzed charge. This represents an enhancement of the rate of calcination of 79-92%, respectively.

The catalyzed charge contained 5% catalyst and the feed rates were 15 lbs/hr and 15.75 lbs/hr for the control and catalyzed charge, respectively. Residence time in the kiln averaged 7.5 minutes and losses by air entrainment and thermal convection were greatest at higher temperature (35%). At 775° to 790° C., the losses were approximately 20% with the untreated limestone and 15% with the catalyzed charge.

While the invention has been described in connection with a preferred embodiment, it is not intended to limit the scope of the invention to the particular form set forth, but, on the contrary, it is intended to cover such alternatives, modifications, and equivalents as may be included within the spirit and scope of the invention as defined by the appended claims.

What is claimed is:

1. A method for the accelerated calcination of a calcium carbonate material comprising heating the calcium carbonate material to a temperature and for a time sufficient to calcine said material to the degree desired while in the presence of a fused salt catalyst consisting of particles having a size above or below that of said calcium carbonate material; said catalyst comprising at least one fused salt having the formula $M_2CO_3 \cdot CaCO_3 \cdot CaO \cdot H_2O_x$, wherein M is an alkali metal selected from sodium or potassium and x is 0 or 1 and the salt is formed by fusing $M_2CO_3$ and $CaCO_3$ in a molar ratio of about 1:2 to 2:1 when the alkali metal is sodium and about 1:1 to 2:1 when the alkali metal is potassium.

2. The method of claim 1 wherein the calcium carbonate material is limestone or dolomite and the catalyst is admixed therewith.

3. The method of claim 1 or 2 wherein the accelerated calcination is the calcining step in the manufacture of a hydraulic cement.

4. The method of claim 1 wherein said catalyst is used in a ratio of 1 to 10 parts by weight for each 100 parts by weight of calcium carbonate material and the temperature is from about 800° to 950° C.

5. The method of claim 1, 2, or 4 including the step of separating the catalyst from the calcined material for reuse.

6. The method of claim 1, 2, or 4 wherein the catalyst is selected from $Na_2O_3 \cdot CaCO_3 \cdot CaO \cdot H_2O_x$ or $K_2CO_3 \cdot CaCO_3 \cdot CaO \cdot H_2O_x$, wherein x is 0 or 1.

7. A method of making a cement comprising calcining a calcium carbonate material in the presence of a catalyst consisting of particles of a size above or below that of said calcium carbonate material; said catalyst having the formula $M_2CO_3 \cdot CaCO_3 \cdot CaO \cdot H_2O_x$, wherein M is an alkali metal selected from sodium or potassium and x is 0 or 1 and the salt is formed by fusing $MCO_3$ and $CaCO_3$ in a molar ratio of about 1:2 to 2:1 when the alkali metal is sodium and about 1:1 to 2:1 when the alkali metal is potassium and said catalyst is used in the ratio of about 1 to 10 parts by weight for each 100 parts by weight of the calcium carbonate material with the resulting calcined product, calcium oxide, comprising a cement.

8. The method of claim 7 wherein the calcium carbonate material is selected from limestone or dolomite and the catalyst is selected from $Na_2CO_3 \cdot CaCO_3 \cdot CaO \cdot H_2O_x$ or $K_2CO_3 \cdot CaCO_3 \cdot CaO \cdot H_2O_x$, wherein x is 0 or 1.

9. The method of claim 7 or 8 wherein the cement is a Portland cement and the mineral mixture used to make the cement is precalcined in the presence of said catalyst and the calcined mixture is then clinkered.

10. A blend adapted to be heated to form CaO comprising a calcium carbonate material and a catalyst consisting of particles having a size above or below that of said calcium carbonate material; said catalyst comprising at least one fused salt having the formula $M_2CO_3 \cdot CaCO_3 \cdot CaO \cdot H_2O_x$, wherein M is an alkali metal selected from sodium or potassium and x is 0 or 1 and the salt is formed by fusing $M_2CO_3$ and $CaCO_3$ in a molar ratio of about 1:2 to 2:1 when the alkali metal is sodium and 1:1 to 2:1 when the alkali metal is potassium.

11. The blend of claim 9 wherein the calcium carbonate material is selected from limestone or dolomite, the fused salt is selected from $Na_2CO_3 \cdot CaCO_3 \cdot CaO$ or $K_2CO_3 \cdot CaCO_3 \cdot CaO$, and the ratio is from about 1 to 10 parts by weight of catalyst for each 100 parts by weight of calcium carbonate material.

* * * * *

UNITED STATES PATENT AND TRADEMARK OFFICE
CERTIFICATE OF CORRECTION

PATENT NO. :   4,828,620
DATED      :   May 9, 1989
INVENTOR(S) :  Mallow, et al It is certified that error appears in the above-identified patent and that said Letters Patent is hereby corrected as shown below:

Column 6, line 13 which should read $M_2CO_3$ instead of $MCO_3$.

Claim 8 in line 23, which now reads $Na_2CO_3 \cdot CaCO_3$]- should read -- $Na_2CO_3 \cdot CaCO_3$. --.

Signed and Sealed this

Tenth Day of October, 1989

Attest:

DONALD J. QUIGG

Attesting Officer

Commissioner of Patents and Trademarks

UNITED STATES PATENT AND TRADEMARK OFFICE
CERTIFICATE OF CORRECTION

PATENT NO. : 4,828,620

DATED : May 9, 1989

INVENTOR(S) : Mallow et al

It is certified that error appears in the above-identified patent and that said Letters Patent is hereby corrected as shown below:

Column 1, line 2, delete the words "BLEND THEREFOR" and insert --BLENDS THEREOF--.

Signed and Sealed this

Third Day of July, 1990

*Attest:*

HARRY F. MANBECK, JR.

*Attesting Officer*      *Commissioner of Patents and Trademarks*